Patented Aug. 8, 1950

2,518,156

UNITED STATES PATENT OFFICE 2,518,156

REACTION OF ETHERS WITH NITRILES

Eugene Edward Magat, Wilmington, Del., assignor to E. I. du Pont de Nemours & Company, Wilmington, Del., a corporation of Delaware No Drawing. Application January 25, 1949, Serial No. 72,773

11 Claims. (Cl. 260—78)

This invention relates to the manufacture of amido compounds and more particularly to a novel process for preparing amides containing a secondary or tertiary carbon atom attached to an amido nitrogen.

Certain N-secondary and N-tertiary alkyl amides have been prepared heretofore, for example N-tertiary butyl acetamide has been prepared by treating pinacoline oxime with $PCl_5$ in ether solution [Scholl, Ann. 338, 16 (1905)]. In general the methods which have been employed previously for the preparation of N-tertiary alkyl amides have been unattractive from an economic standpoint and for this reason, among others, these compounds have not been heretofore available in commercial quantities.

An object of this invention therefore is to provide a simple, economical and commercially feasible process for preparing amido compounds containing a secondary or tertiary carbon atom attached to the nitrogen of an amide group.

Another object is to prepare synthetic linear polyamides by a polymerization reaction carried out at substantially room temperature in contradistinction to the high temperatures (180–300° C.) and, hence, expensive polymerization reaction required to form these linear polyamides by the processes heretofore known to the art.

These and other objects will more clearly appear hereinafter.

The above objects are realized by this invention, which comprises reacting an organic nitrile with preferably, a substantially equimolecular amount of a secondary or tertiary ether in the presence of a strong acid and water. After the reaction has proceeded for a length of time sufficient to obtain a satisfactory yield, an amide of the general formula:

is formed, wherein R is the organic radical from the nitrile and R' is a secondary or tertiary carbon atom-containing radical from the ether. The reaction is exothermic and occurs at room temperature, giving high yields in short periods of time of the order of 2 hours in the case of benzonitrile and diisopropylether, for example. The resulting amide may be easily isolated by pouring the reaction mixture into water followed by filtration.

The following series of reactions wherein, by way of example, methyl secondary butyl ether, benzonitrile and water are reacted in the presence of sulfuric acid, illustrate a theoretical concept of the mechanism of the reaction involved in the process of this invention:

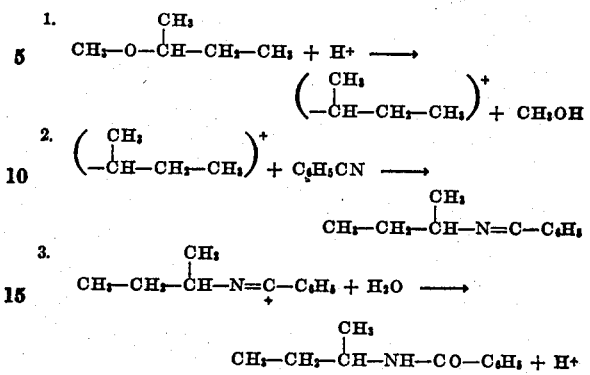

The process of this invention is applicable to all nitriles and dinitriles. The operable nitriles may be formulated as R—CN, in which R is an organic radical free of reacting groups, or hydrogen. This radical may be aliphatic, aromatic, cyclic, alicyclic, saturated, unsubstituted or substituted by groups which do not interfere with the amidation reaction. As suitable examples of such nitriles may be mentioned hydrogen cyanide, acetonitrile, butyronitrile, valeronitrile, dodecylcyanide, etc. The dinitriles may be formulated as NC—R—CN, in which R is a bivalent organic radical free of reacting groups or is nonexistent, e. g. cyanogen. The bivalent radical joining the nitrile groups, as in the case of the mononitriles, may be aliphatic, aromatic, cyclic or heterocyclic, saturated or unsaturated and may be unsubstituted or substituted by non-reacting groups, i. e., groups which do not interfere with the amidation reaction. The dinitrile may contain alcohol and thiol unreactive groups, for example primary ether, sulfide, ketone, ester of a primary alcohol, amide, halogen and the like. Specific suitable dinitriles are the following: malononitrile, succinonitrile, glutaronitrile, adiponitrile, pimelonitrile, suberonitrile, azelonitrile, sebaconitrile, isophthalonitrile, terephthalonitrile, hexahydroterephthalonitrile, β-phenyladiponitrile, β-methyladiponitrile, 3-nitrophthalonitrile, α-amino-adiponitrile, 1,4-dicyanobutene-2 and the like.

Likewise, all secondary and tertiary ethers of secondary and tertiary alcohols free of other reacting groups are reactive with mono- or difunctional nitriles to form amides having one or two amide groupings in accordance with the principles of this invention. Examples of such ethers are primary-secondary ethers, preferably alkyl ethers, such as methyl secondary butyl ether; primary-tertiary ethers, such as methyl tertiary butyl ether; disecondary ethers, such as diisopropyl ether; ditertiary ethers, such as ditertiary butyl ether; and, of course, secondary-tertiary ethers, such as isopropyl tertiary butyl ether. Additionally, the cyclic ethers are useful, especially those substituted on the α carbon atom, e. g., propylene oxide, 2-methyl tetrahydrofuran, etc.

The above ethers are useful with mono- or dinitriles to produce amides having one or two amide linkages. However if it is desired to prepare a molecule having a multiplicity of amide linkages, e. g., a synthetic linear polyamide, it is necessary to use a diether in conjunction with a dinitrile. Representative of diethers that may be used in preparing synthetic linear polyamides, are 1,1,6,6-tetramethylhexamethylene - 1,6-glycol dimethyl ether; 1,1,6 - trimethyloctamethylene-1,6-glycol dimethyl ether; 1,10-dimethyldecamethylene-1,10-glycol diethyl ether. Of course, it will be realized that if a diether is used in conjunction with a mononitrile diamides will be formed.

As an alternative group of related reactants suitable for making polyamides there may also be mentioned the cyanoethers. Here again it is necessary that the ether present be secondary or tertiary. With this class of reactant a self-condensation occurs under the conditions of the process of this invention and a polyamide is formed. As some examples of suitable cyanoethers, the following are representative:

1-cyano-7,7-dimethyl-7-methoxy-3-oxaheptane
2-methoxy-10-cyanodecane
2-methoxy-2-methyl-6-cyanohexane
4-methyl-4-methoxy-cyanocyclohexane If desired an intermediate may be formed under anhydrous conditions and then hydrolyzed to form the amides. For example, 100% or slightly fuming sulfuric acid alone or in combination with acetic acid may be diluted with alcohol and used as the reaction medium. However, the preferred process is to carry out the subject reaction in the presence of at least a molecular equivalent of water. A large excess of water, however, should not be used since it would tend to slow the rate of reaction.

The concentration of nitrile to ether in the process of this invention may vary from a mol ratio of 1:3 to 3:1 or higher. Obviously, if both reactants have the same number of functional groups, then generally a 1:1 mol ratio within ±10% may preferably be used. If too high a ratio of one of the reactants is used, unless an exceptionally high yield is obtained, the process is much less attractive commercially.

It has been found, in general, that strong acids are useful as catalysts in the process of this invention. Examples of satisfactory acids suitable for purposes of this invention are sulfuric acid, benzene sulfonic acid, toluene sulfonic acid, phosphoric acid, boron trifluoride, hydrofluoric acid, alkane sulfonic acids, aluminum chloride, or a mixture of various acids such as a mixture of sulfuric and acetic acids, or a mixture of sulfuric and phosphoric acids. The acids catalyst may very conveniently be used as the reaction medium. A preferred reaction medium is a mixture of sulfuric and acetic acids ranging in concentration from a composition of 25% sulfuric acid and 75% acetic acid up to fuming sulfuric acid. In general, in reacting secondary ethers, more stringent conditions and stronger acid media are needed for comparable yields.

Usually, it is not necessary to heat the reagents, since the reaction generally takes place spontaneously with more or less evolution of heat. In some cases, however, where less active reactants or weaker acid catalysts such as formic acid are employed, heating may well be advantageous. The reaction may be carried out in the range of −20° C. or lower up to 100° C. or higher with the range 20° C.–40° C. being preferred. External cooling of the reaction mixture should be employed where volatile reactants are used or where the nature of the reactants is such that external cooling seems indicated.

The time of reaction required has been found to vary somewhat according to the particular ether or nitrile used, although a few hours are sufficient to substantially complete the reaction in most cases. The particular acid medium in which the reaction takes place may also increase or decrease the time necessary for complete reaction. In some cases a very short period, about ½ hour or less, is sufficient, although in the case of less reactive ingredients, this time of reaction may run up to as much as 1 or 2 days or more.

The order in which the reactants are mixed is not important and may be varied to suit the particular case in hand. It has been found advantageous, however, in most cases to mix or dissolve the ether in the nitrile first and then add this mixture to the acid solvent. This, however, is not an essential step in the process and merely constitutes a convenient method for adding the ether and nitrile in equivalent amounts. It will normally not be necessary to use an additional solvent since a large number of ethers form a compatible solution with nitriles and dissolve completely. The concentration of the reactants in the acid may be from between 2–20% by weight with the range of 10–20% preferred.

The amides of this invention may be prepared in reactors constructed of or lined with glass, porcelain, enamel, silver, gold, platinum, etc., the main requirement being, of course, that the acid used as catalyst should not react with the reactor material. This is rather important since certain metal salts have a tendency to produce an off-colored product and may in fact inhibit the reaction.

The following specific examples wherein are set forth preferred embodiments, further illustrate the principles and practice of this invention: Parts and percentages are by weight unless otherwise indicated.

*Example I*

A solution of 5.10 parts (0.05 mol) of diisopropylether and 5.15 parts (0.05) of benzonitrile is added with stirring to 25 cc. of concentrated sulfuric acid. It is necessary to cool the mixture to maintain the reaction temperature below 30° C. The reaction is allowed to proceed with stirring for a period of 2 hours and then the reactants are poured into water to precipitate the product. The amide is isolated by filtration and then dried for 5 hours at 65° C. The yield in this case is 81% of N-isopropylbenzamide, which has a melting point of 98–99° C.

*Example II*

4.40 parts (0.05 mol) of methyl secondary butyl ether is dissolved in 5.15 parts (0.05 mol) of benzonitrile and the solution added to 25 cc. of concentrated sulfuric acid with stirring. Reactants are maintained in the vicinity of 30° C., which necessitates cooling, since the reaction is exothermic. After a reaction time of 16 hours, the reaction mixture is poured into water, filtered and dried as described in Example I and a 46% yield of N-secondary butyl benzamide is obtained, which has a melting point of 81–82° C.

Example III

A solution of 4.40 parts (0.05 mol) of methyl tertiary butyl ether in 5.15 parts (0.05 mol) of benzonitrile and 5 cc. acetic acid is added with stirring to a solution of 3 cc. of 100% $H_2SO_4$ and 10 cc. acetic acid, keeping the temperature below 30° C. by cooling. At the end of 4 hours the solution is poured into water and the amide is isolated by filtration and drying, as described previously, to give an 85% yield of N-tertiary butyl benzamide.

Example IV 5.10 parts (0.05 mol) of diisopropylether in 5.15 parts (0.05 mol) of benzonitrile is added with stirring to 25 cc. of 100% sulfuric acid under the same conditions described in Example I. After a reaction time of 2½ hours, the solution is poured into water whereupon the N-isopropyl benzamide precipitates to give a yield after drying of 73%.

The following examples demonstrates a process of this invention when it is desired to utilize both functional groups of one of the reactants, in this case diisopropylether.

Example V

A solution of 5.10 parts (0.05 mol) of diisopropylether in 10.3 parts (0.10 mol) of benzonitrile is added with stirring to 25 cc. of concentrated sulfuric acid. After a reaction time of 2½ hours, the mixture is precipitated with water, washed and dried and gives a 66% yield of the N-isopropyl benzamide (based on benzonitrile).

Example VI

A solution of 2.58 parts (0.01 mol) of the dimethyl ether of a,a'-tetramethyldecamethylene glycol and 1.08 parts (0.01 mol) of adiponitrile in 1 cc. 100% $H_2SO_4$ and 3 cc. glacial acetic acid is allowed to stand at room temperature for 24 hours. After addition of water a putty-like polyamide, poly a,a'-tetramethyldecamethylene adipamide, is isolated.

Example VII 1.28 parts of terephthalonitrile (0.01 mol) is used in place of adiponitrile in Example VI. The resulting polyamide poly a,a'-tetramethyldecamethylene terephthalamide has a softening point of 120° C.

Example VIII

A solution of 5.4 parts (0.05 mol) of adiponitrile, and 10.3 parts (0.1 mol) of methyl-tertiary-butyl ether in 10 cc. of glacial acetic acid is added with stirring and cooling (30° C.) to a solution of 10 grams 100% $H_2SO_4$ in 20 cc. glacial acetic acid. After a reaction time of three hours, the reaction mixture is poured into water whereupon di N-tertiarybutyl adipamide precipitates out and is isolated by filtration. The yield is 75% of the diamide and has a melting point of 212° C.

Example IX

A solution of 5.4 parts (0.05 mol) of adiponitrile and 10.2 parts (0.1 mol) of diisopropyl ether is added slowly with stirring and cooling to 30° C. to 25 cc. of concentrated $H_2SO_4$. After a reaction time of five hours the solution is poured into a mixture of ice and water. After neutralization, di N-isopropyl benzamide precipitates out and is isolated by filtration. The yield is 63%.

Example X

A solution of 4.11 parts (0.1 mol) of acetonitrile and 10.3 parts (0.1 mol) of methyl-tertiary-butyl ether in 10 cc. of glacial acetic acid is added with stirring and cooling to 30° C. to a solution of 10 grams 100% $H_2SO_4$ in 20 cc. glacial acetic acid. After a reaction time of 3 hours, the mixture is poured into water, neutralized with calcium carbonate and the filtrate is concentrated until precipitation of n-tertiarybutyl-acetamide results.

The organic amides and diamides containing a secondary or tertiary carbon atom attached to the nitrogen of the amido group are useful as solvents, plasticizers, glycerine substitutes, resin intermediates, etc. Of course, the synthetic linear polyamides formed when difunctional reactants are used are useful in all the many ways that have been described in the prior art to include formation into textile yarns by wet-, dry-, or melt-spinning processes as well as to make rods, bristles, sheets, foils, ribbons, films and the like. They are also useful in connection with various blending agents, such as resins, plasticizers, cellulose derivatives, etc., to form coating compositions, lacquers, molded articles, and other such materials. When it is desired to form polyamides by the process of this invention, a most important advantage accrues, viz., room temperature polymerization. This low temperature polymerization is obviously much more attractive commercially than the melt polymerization process of the prior art.

As many widely different embodiments can be made without departing from the spirit and scope of my invention, it is understood that said invention is in no wise restricted except as set forth in the appended claims.

I claim:

1. A process for preparing amides which comprises reacting an organic nitrile free of reacting substituent groups with an ether selected from the group consisting of secondary and tertiary ethers of secondary and tertiary alcohols free of other reacting groups, in the presence of a strong acid catalyst and water.

2. The process of claim 1 wherein the nitrile and the ether together comprise from 2–20% by weight of the initial reaction mixture.

3. A process for preparing amides which comprises reacting an organic nitrile free of reacting substituent groups with an ether from the group consisting of secondary and tertiary ethers of secondary and tertiary alcohols free of other reacting groups, in the presence of a strong acid catalyst and water, and at a temperature of from 20° C. to 40° C.

4. A process for preparing amides which comprises reacting substantially molecular equivalents of an organic nitrile free of reacting substituent groups and an ether selected from the group consisting of secondary and tertiary ethers of secondary and tertiary alcohols free of other reacting groups, in the presence of a strong acid catalyst and water.

5. A process for preparing amides which comprises reacting substantially molecular equivalents of an organic dinitrile free of reacting substituent groups and a diether selected from the group consisting of secondary and tertiary diethers of secondary and tertiary alcohols free of other reacting groups, in the presence of a strong acid catalyst and water.

6. The process of claim 5 wherein the nitrile and the ether together comprise 2-20% by weight of the initial reaction mixture.

7. The process of claim 4 wherein the nitrile is benzonitrile and the ether is diisopropyl ether.

8. The process of claim 4 wherein the nitrile is benzonitrile and the ether is methyl tertiary butyl ether.

9. The process of claim 4 wherein the nitrile is adiponitrile and the ether is diisopropyl ether.

10. The process of claim 4 wherein the nitrile is adiponitrile and the ether is methyl-tertiary-butyl ether.

11. The process of claim 5 wherein the dinitrile is adiponitrile and the diether is the dimethyl ether of $a,a'$-tetramethyldecamethylene glycol.

EUGENE EDWARD MAGAT.

No references cited.